United States Statutory Invention Registration [19]

[11] Reg. Number: H781

Stern et al. [43] Published: May 1, 1990

[54] METHOD OF MAKING A FERRITE CIRCULATOR

[75] Inventors: Richard A. Stern, Allenwood; Richard W. Babbitt, Fair Haven, both of N.J.

[73] Assignee: The United States of America as represented by the Secretary of the Army, Washington, D.C.

[21] Appl. No.: 171,325

[22] Filed: Mar. 21, 1988

[51] Int. Cl.[5] ..... B05D 1/00

[52] U.S. Cl. ..... 427/34; 427/37; 427/99; 427/126.6; 427/127; 427/128

[58] Field of Search ..... 427/34, 37, 99, 126.6, 427/127, 128

[56] References Cited

U.S. PATENT DOCUMENTS

| | | | |
|---|---|---|---|
| 3,935,548 | 1/1976 | Rosenbaum et al. | 333/24.2 |
| 3,986,149 | 10/1976 | Harris et al. | 333/161 |
| 4,179,795 | 12/1979 | Babbitt | 427/129 |

FOREIGN PATENT DOCUMENTS

| | | | |
|---|---|---|---|
| 52-25953 | 7/1977 | Japan | 427/37 |

*Primary Examiner*—Stephen J. Lechert, Jr.
*Attorney, Agent, or Firm*—Sheldon Kanars; Roy E. Gordon

[57] ABSTRACT

In the manufacture of a ferrite circulator, a ferrite material is introduced into the cavity area of a microstrip circuit or substrate by arc plasma spraying, thus eliminating any chance of gaps between ferrite material and microstrip circuit material.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF MAKING A FERRITE CIRCULATOR

The invention described herein may be manufactured, used, and licensed by or for the Government for governmental purposes without the payment to us of any royalty thereon.

This invention relates in general to a method of making a ferrite circulator and in particular to an improved method of introducing ferrite material into the cavity area of a microstrip circuit.

BACKGROUND OF THE INVENTION

Current millimeter wave microstrip circulators use a small metallized (top and bottom) ferrite puck that must be accurately cut and ground so as to tightly fit into a hole in a microstrip substrate, then electrically connected to the top conductor and bottom ground plane. This type of circulator requires a very close tolerance fit of the ferrite into the dielectric substrate for peak performance. It is therefore obvious that a need exists for a simplified fabrication technique, especially for operation at high frequencies (>10 GHz) where device parts and pieces become very small such that tolerances present costly fabrication problems.

SUMMARY OF THE INVENTION

A general object of this invention is to provide a simple and economical technique or method of making a ferrite circulator. A more particular object of this invention is to provide a method of introducing ferrite material into the cavity area of a microstrip circuit.

It has now been found that the aforementioned objects can be attained by arc plasma spraying the ferrite material into the cavity area of the microstrip circuit, thus eliminating any chance of gaps between ferrite material and microstrip substrate material.

Accurate and controlled spraying is possible with minimal surface finishing required after ferrite formation.

After the ferrite has been deposited, an anneal is required to optimize the magnetic properties.

Metallization can be applied to the surface of the anneal ferrite by flame spraying or by deposition processes after the ferrite is deposited. This method of ferrite fabrication is fast, accurate and low-cost as compared to conventional techniques. It also preserves or improves high isolation and low insertion loss over the operating circulator bandwidth.

The method of the invention allows precise, simple and economical fabricating of ferrite Y-junction circulators in the microstrip media operating in the microwave and millimeter wave frequency region heretofore not possible with conventional fabrication techniques.

By arc plasma spraying as the term is used herein, is meant, a process of feeding ferrite powder into an electric arc where it is melted and directed to a target. Such a process is shown in the articles "Arc Plasma Fabrication of Ferrite—Dielectric Composites" by R. W. Babbitt, American Ceramic Society Bulletin, June 1976, at page 566–568.

In the arc plasma or flame spray method, any free flowing ferrite powders can be used. The method is generally short duration taking about 2 minutes.

We wish it to be understood that we do not desire to be limited to the exact details as described for obvious modifications will occur to a person skilled in the art.

What is claimed is:

1. In the manufacture of a ferrite circulator wherein a ferrite material is introduced into the cavity area of a microstrip circuit, the improvement of introducing the ferrite material into the cavity area by arc plasma spraying and subsequent annealing, thus eliminating any chance of gaps between ferrite material and microstrip circuit material.

2. A manufacture according to claim 1 wherein accurate and controlled spraying and annealing is possible with minimal surface finishing required after ferrite formation.

3. A manufacture according to claim 2 wherein metallization is applied to the surface of the ferrite by flame spraying after ferrite fabrication.

4. A manufacture according to claim 2 wherein metallization is applied to the surface of the ferrite by deposition processes after ferrite fabrication.

* * * * *